United States Patent

Johnson et al.

[11] Patent Number: 6,081,881
[45] Date of Patent: Jun. 27, 2000

[54] METHOD OF AND APPARATUS FOR SPEEDING UP THE EXECUTION OF NORMAL EXTENDED MODE TRANSFER INSTRUCTIONS

[75] Inventors: David C. Johnson, Roseville; Gary J. Lucas, Pine Springs, both of Minn.

[73] Assignee: Unisys Corporation, Blue Bell, Pa.

[21] Appl. No.: 09/026,935

[22] Filed: Feb. 20, 1998

[51] Int. Cl.[7] ................................................. G06F 12/00
[52] U.S. Cl. ................................................. 711/220; 711/2
[58] Field of Search ................................... 711/219, 220, 711/2, 5

[56] References Cited

U.S. PATENT DOCUMENTS

| | | | |
|---|---|---|---|
| 4,096,568 | 6/1978 | Bennett et al. | 364/200 |
| 4,827,406 | 5/1989 | Bischoff et al. | 364/200 |
| 5,155,834 | 10/1992 | Ryan et al. | 395/425 |
| 5,414,821 | 5/1995 | Nguyen et al. | 711/203 |
| 5,479,627 | 12/1995 | Khalidi et al. | 395/415 |
| 5,504,871 | 4/1996 | Takashi | 395/405 |
| 5,611,065 | 3/1997 | Alferness et al. | 711/220 |
| 5,732,404 | 3/1998 | Johnson et al. | 711/2 |

FOREIGN PATENT DOCUMENTS

0708565 A2   4/1996   Rep. of Korea.

*Primary Examiner*—John W. Cabeca
*Assistant Examiner*—Pierre M Vital
*Attorney, Agent, or Firm*—Charles A. Johnson; Mark T. Starr; Nawrocki, Rooney & Sivertson, P.A.

[57] ABSTRACT

A method and apparatus for reducing processor response time to selected transfer instructions in an instruction processor using a plurality of memory banks including four banks in a basic mode and one memory bank in an extended mode. This invention provides fast transfer hardware to improve the response time by a speed up transfer for normal extended mode transfer instructions only. The bank descriptor of the instruction is used to determine appropriate transfer instructions which are then tested for characteristics indicating whether a fast transfer is possible. The fast transfer process requires fewer checks than the previous apparatus which accelerates the response to selected transfer instructions by one cycle.

5 Claims, 6 Drawing Sheets

METHOD OF AND APPARATUS FOR SPEEDING UP THE EXECUTION OF NORMAL EXTENDED MODE TRANSFER INSTRUCTIONS

CROSS REFERENCE TO CO-PENDING APPLICATIONS

The present application is related to U.S. patent application Ser. No. 09/026,840, filed Feb. 2, 1998 entitled "Method of and Apparatus for Saving Time Performing Certain Transfer Instructions".

BACKGROUND OF THE INVENTION

1. Field of the Invention

The present invention generally relates to general purpose digital data processing systems and more particularly relates to such systems utilizing extended mode transfer instructions.

2. Description of the Prior Art

It is now common in large scale data processing systems to permit software developers to treat real storage as virtual memory. This is a technique wherein all memory accesses by a specific use program are relative in nature. The major advantage of this approach is that memory management can be efficiently performed by the system at the time of program execution depending upon resource availability and requests from the users. This memory management appears transparent to the user. The 2200/900 system available from the assignee of the present invention including explanatory documentation, and hereby incorporated herein by reference, is such a system employing virtual addressing.

This system, as well as all other systems utilizing virtual addresses, must convert instructions in the operating programs from virtual to real addresses. To translate from the virtual address some systems such as U.S. Pat. No. 4,827,406 issued to Bischoff et al. use a translation table.

Nguyen et al. U.S. Pat. No. 5,414,821 describes the 2200/900 computer system of Unisys which employs virtual addressing converted to an absolute address by adding a base address to an offset provided by the virtual address. Nguyen et al., assigned to the same assignee as the present invention, is hereby also incorporated by reference.

Essentially these systems accomplish the translation from virtual addresses to absolute addresses by providing a base address, which indicates one of a plurality of base memories, plus an offset value, which indicates a particular word location within the indicated base memory, and summing the two together. The summing operation is performed using an special adder which sums the two quantities to provide a unique real or absolute address. The information needed to perform this operation is provided by the instruction which contains both the base address and the offset value for summation. This approach includes transfer instructions.

SUMMARY OF THE INVENTION

The present invention relates to processors with multiple memory banks which have virtual addresses provided by the application programs. In previous apparatus virtual addresses for extended normal transfer instructions are converted to absolute addresses in an address generator by adding the offset provided by the instruction to a base address provided by the same instruction.

The present invention provides apparatus and method for reducing the response time of extended mode transfer instructions over the time required by the prior art by a speed up transfer mechanism for certain selected transfer instructions. This speed up transfer generates an absolute address by adding the offset provided by the current instruction to the base address stored in a base register provided by the currrent instruction using a new data path.

A determination is made that the instruction is for a normal extended mode instruction of the proper type to determine if the speed up results can be used, in coincidence with a specific control signal. A selector is provided which can select between an absolute address generated by the speed up transfer and an absolute address generated by the usual main address generator. This selector obtains the appropriate absolute address for the instruction cache.

The time required to compute the absolute address using the base address provided by the current instruction using a new data path, along with fewer computations required in a simple adder versus the checks in a main address generator, reduces the computation time by one cycle for each such transfer instruction.

BRIEF DESCRIPTION OF THE DRAWINGS

Objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION

Figure 1:
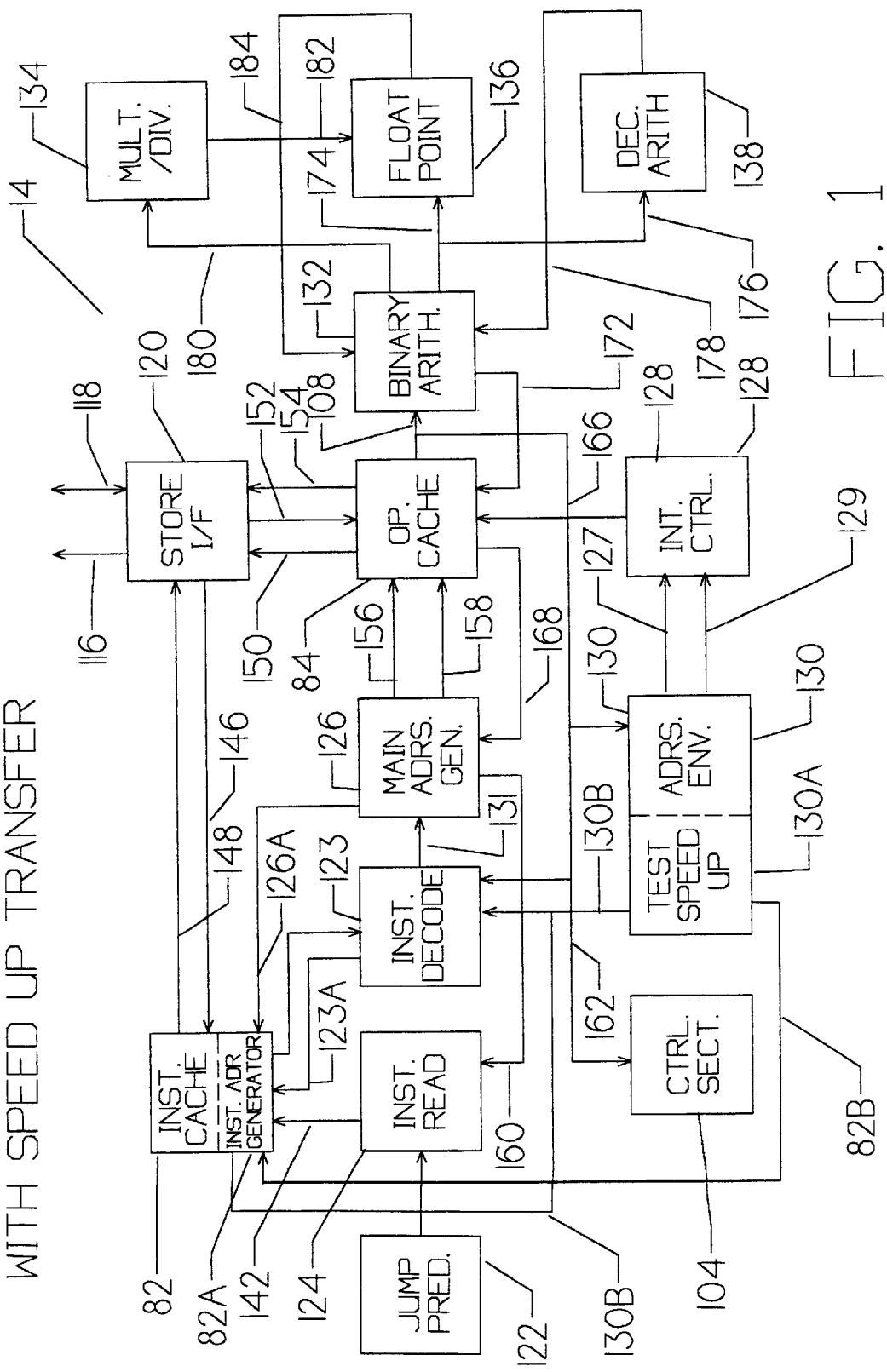
FIG. 1 is a detailed block diagram of the instruction processor incorporating the extended mode speed up transfer apparatus.

FIG. 1 is an overall diagram of a data processing system 14 including the new elements of the present invention and showing their interaction. The major data paths shown for the previous apparatus are identified by number, while the data paths added for an extended mode speed up transfer have a number and a letter postscript identifier. The present invention has apparatus and method for reducing the response time of extended mode transfer instructions over the time required by the prior art by a speed up transfer for selected transfer instructions.

The interface from processing system 14 to system memory consists of write cable 116 and read/write cable 118. The function of a write stack is incorporated within store interface 120. Addressing information for store interface 120 is sent from instruction cache 82 via cable 148 and operand cache 84 via cable 150 for a corresponding cache miss. Instructions are sent to instruction cache 82 via path 146. Operand data read by system memory is transferred from store interface 120 to operand cache 84 by path 152. Similarly, write operand data is sent from operand cache 84 to store interface 120 via path 154.

Instructions to be executed are addressed by instruction read 124 as follows. The addresses are computed using one of the base registers located within address environment 130, explained in more detail below. If the instruction is the next sequential instruction, its instruction is determined by incrementing the program address counter. If the instruction to be executed was a branch or jump instruction, the address was computed by main address generator 126 and supplied via path 160. Alternatively, the address is supplied by jump prediction 122 via path 140 during operation in the jump prediction mode. The address of the next instruction was provided to instruction cache 82 via path 142.

The next addressed instruction is fetched from instruction cache 82 if a match is found. If the request results in a cache miss, system memory is requested to read the memory block containing the instruction. In either case, the instruction is provided to instruction decoder 123 via path 144. The instruction is decoded through the use of a microcode controller by instruction decode 123, and the operand address is computed by main address generator 126 from the data received via path 131.

Operand cache 84 contains a general register stack. The cache is addressed by the output of address generator 126 received from path 158. Direct operands are received on path 156. If a match is not made in operand cache 84, a read request is made of system memory through store interface 120. If a match is found in operand cache 84 or if the instruction specifies a direct operand received on path 156, the operand data is immediately produced. In either case, the operand data is routed in accordance with the operation to be performed as specified by the instruction.

One category of instructions, those pertaining to the present invention, involves a change to the base registers within addressing environment 130. The data is supplied to addressing environment 130 via path 166. Interrupt control 128 provides the interrupt data to operand 84 via path 170. Control section 104 provides the overall microcode control.

The present invention provides additional apparatus for providing a speed up arrangement for selected transfer functions to improve the response time of previous apparatus for normal extended mode transfer instructions only.

FIGS. 1, 2, 3, 4, 5 and 6 collectively show the apparatus, its characteristics and the response times. Test speed up 130A is new apparatus incorporated into the address environment 130, arranged to determine whether the instruction is a transfer instruction of the type which can be speeded up. Instruction address generator 82A, which is a current part of instruction cache 82, has several elements added which are necessary to perform the transfer instruction speed up. Lines 82B from test speed up 130A to instruction address generator 82A, lines 123A from instruction decode 123 to instruction address generator 82A, lines 126A from main address generator 126 to instruction address generator 82A, and lines 130B from address environment to instruction decode 123 and instruction cache generator 82A indicate additional data and control paths which are used by the speed up transfer apparatus.

Figure 3:
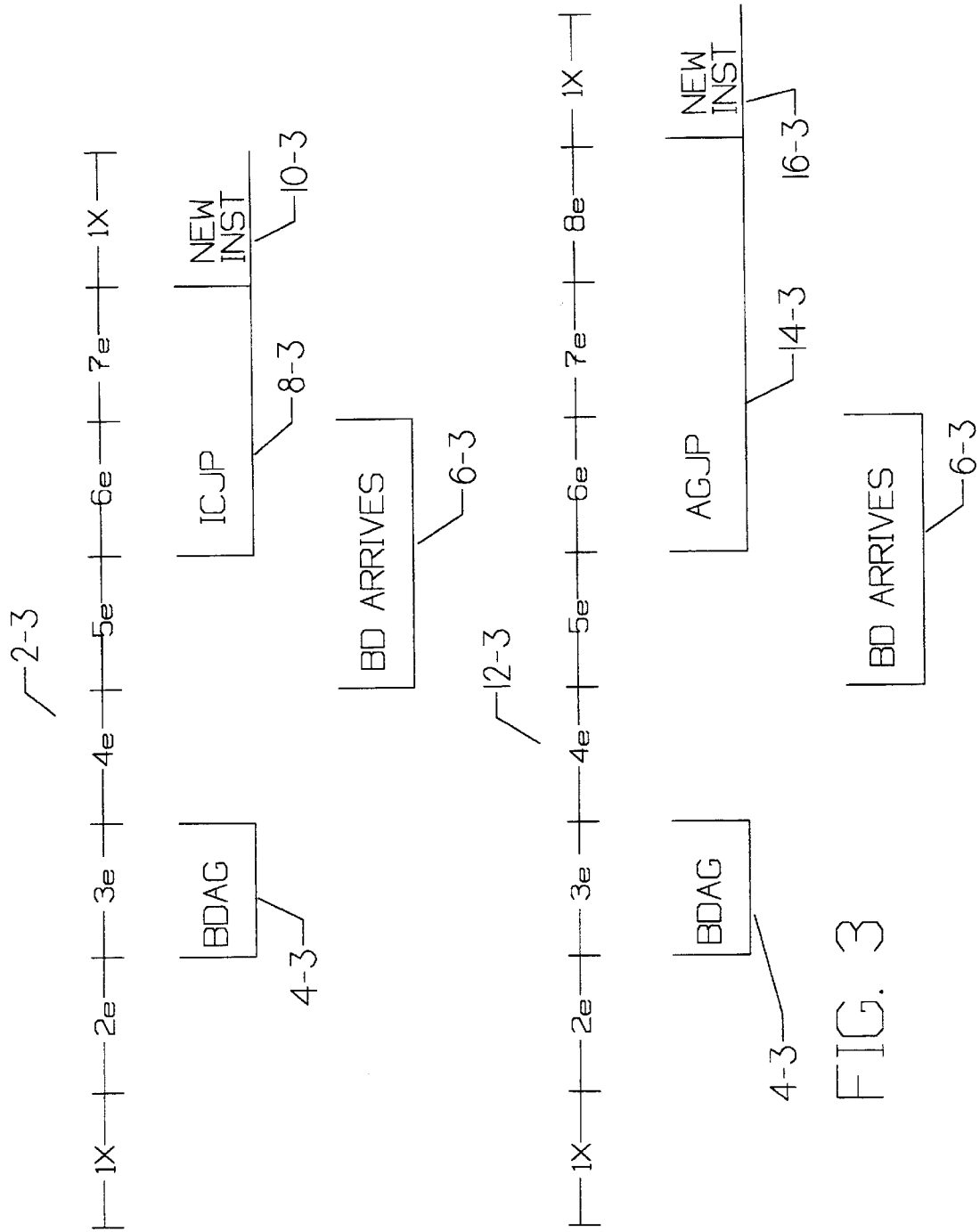
FIG. 3 is a timing diagram for the previous and the speed up transfer of normal extended mode instructions.

In FIG. 3 the execution times for the previous and the speed up transfer instruction are shown. Time scale 2-3 indicates the speed up timing for selected transfer instructions, and time scale 12-3 indicates the timing cycles without the speed up apparatus. The major time cycles for time scale 2-3 are 1X, 2e, 3e, 4e, 5e, 6e and 7e with the cycles then repeating again from the second 1X cycle. The major time cycles for time scale 12-3 are 1X, 2e, 3e, 4e, 5e, 6e, 7e and 8e with the cycles then repeating again from the second 1X cycle.

In both systems bank descriptor address generator sequence (BDAG) 4-3 starts during cycle 3e. BDAG is generated by the instruction using existing apparatus and execution cycles. The address generation sequence obtains a bank descriptor from memory. The bank descriptor is available for use in both systems during cycle 5e, labeled BD Arrives 6-3, in both systems.

Figure 2:
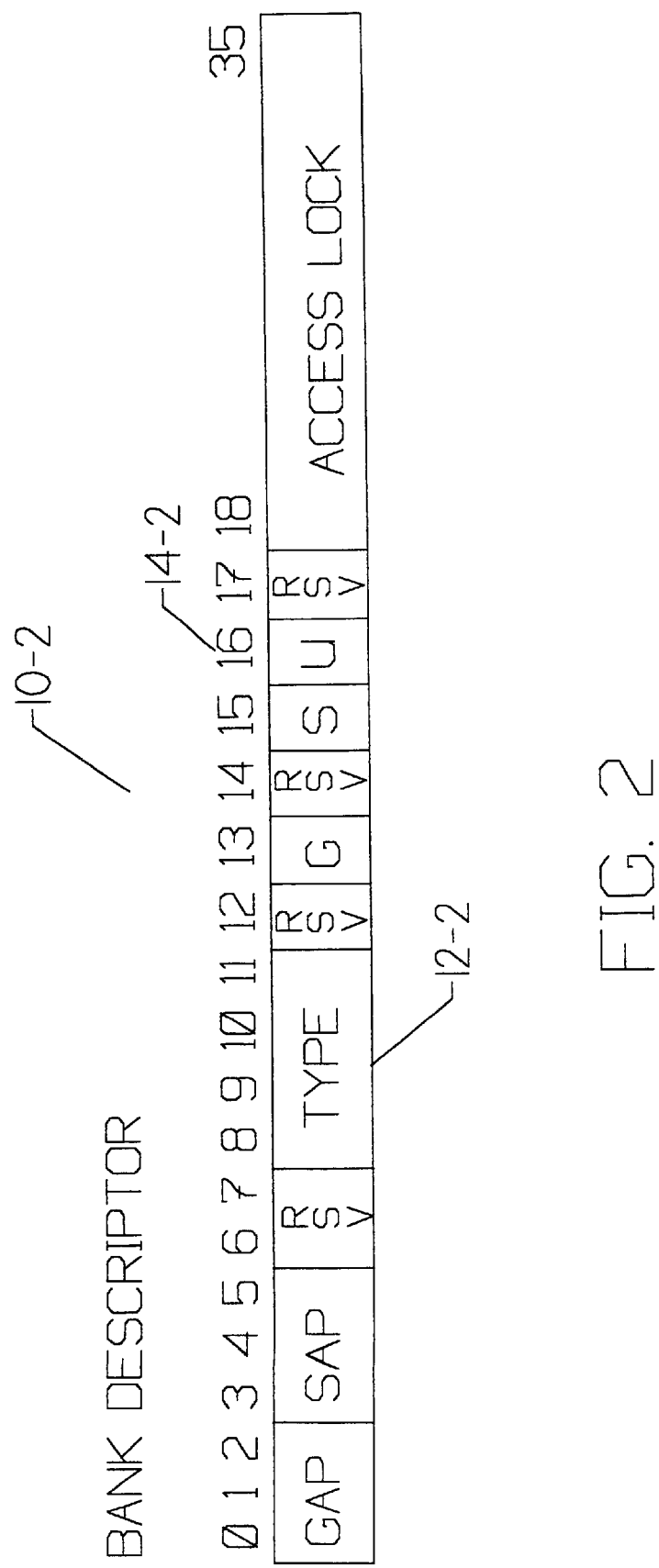
FIG. 2 illustrates the first word of the four word bank descriptor format.

FIG. 2 shows the format for the first word of the total four word field, i.e., bank descriptor 10-2 where bits 8, 9, 10 and 11 of the first word designate the bank descriptor type field 12-2.

The response to a selected transfer function is shown as instruction cache jump sequence (ICJP) 8-3 in the speed up system and as main address generation jump sequence (AGJP) 14-3 in the previous apparatus. ICJP 8-3 is executed in cycles 6e and 7e and a new instruction 10-3 is available at the 1X cycle in time scale 2-3 after the 7e cycle. By contrast the AGJP 14-3 is executed in cycles 6e, 7e and 8e and a new instruction 16-3 is available at the 1X cycle in time scale 12-3 after the 8e cycle. As shown by a comparison of the time scales, the speed up apparatus uses one less cycle then the previous apparatus every time a transfer function is selected and speeded up. The reason that one less cycle is required will be discussed later.

Figure 4:
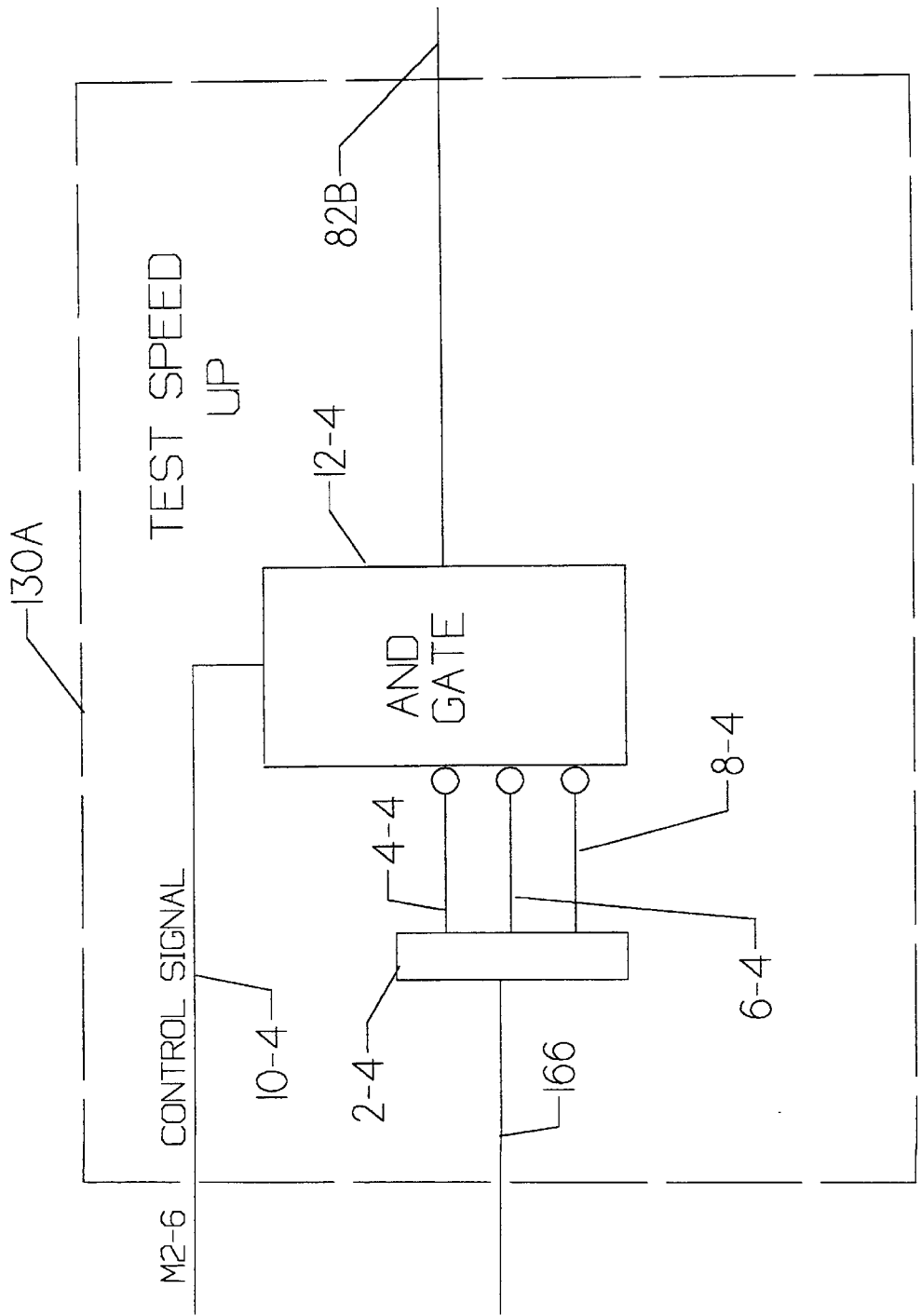
FIG. 4 is the test speed up verify apparatus.

Whether the instruction is the type which can be speeded up is determined in test speed up 130A. Test speed up 130A is added for this invention as part of address environment 130. The detailed block diagram of test speed up 130 is shown in FIG. 4, and a detailed description of the operation follows. As part of the execution of a transfer instruction the bank descriptor is transmitted over lines 166 from operand cache 84 to test speed up 130A where the data is stored in register 2-4.

As shown in FIG. 2, bank descriptor 10-2, has a type field 12-2 as indicated by bits 8, 9, 10 and 11 of bits 142. As shown in the timing FIG. 3, the bank descriptor 6-3 is routed to test speed up 130A for each instruction at time Se for both time scale 2-3 in the present invention and time scale 12-3 in the previous system.

As indicated earlier, test speed up 130A determines if the instruction is the type which can be speeded up. As shown in FIG. 4, bits 8, 10 and 11 of the bank descriptor type field are included in this data with bit 8 output on line 4-4, bit 10 output on line 6-4 and bit 11 output on line 8-4 from register 2-4 to provide inputs to AND gate 124. In bank descriptor 10-2, bits 8, 9, 10 and 11 together determine the data type in hexadecimal number notation. When bits 8, 10 and 11 are all zero this represents data type 0 or 4 hexadecimal. Type 0 and 4 indicate to the test speed up 130A that this is the type of instruction which can be speeded up. When the bank descriptor type is 0 or 4 hexadecimal, and when the enabling M2 microcode control signal 10-4 is high at cycle 5e, for both time scale 2-3 and 12-3, then AND gate 12-4 will provide a high output on line 82B. When the output of AND GATE 12-4 on line 82B is high this indicates a speed up for that instruction. Line 82B provides this information to instruction address generator 82A which performs the actual speed up operation, a description of this operation follows.

Figure 5:
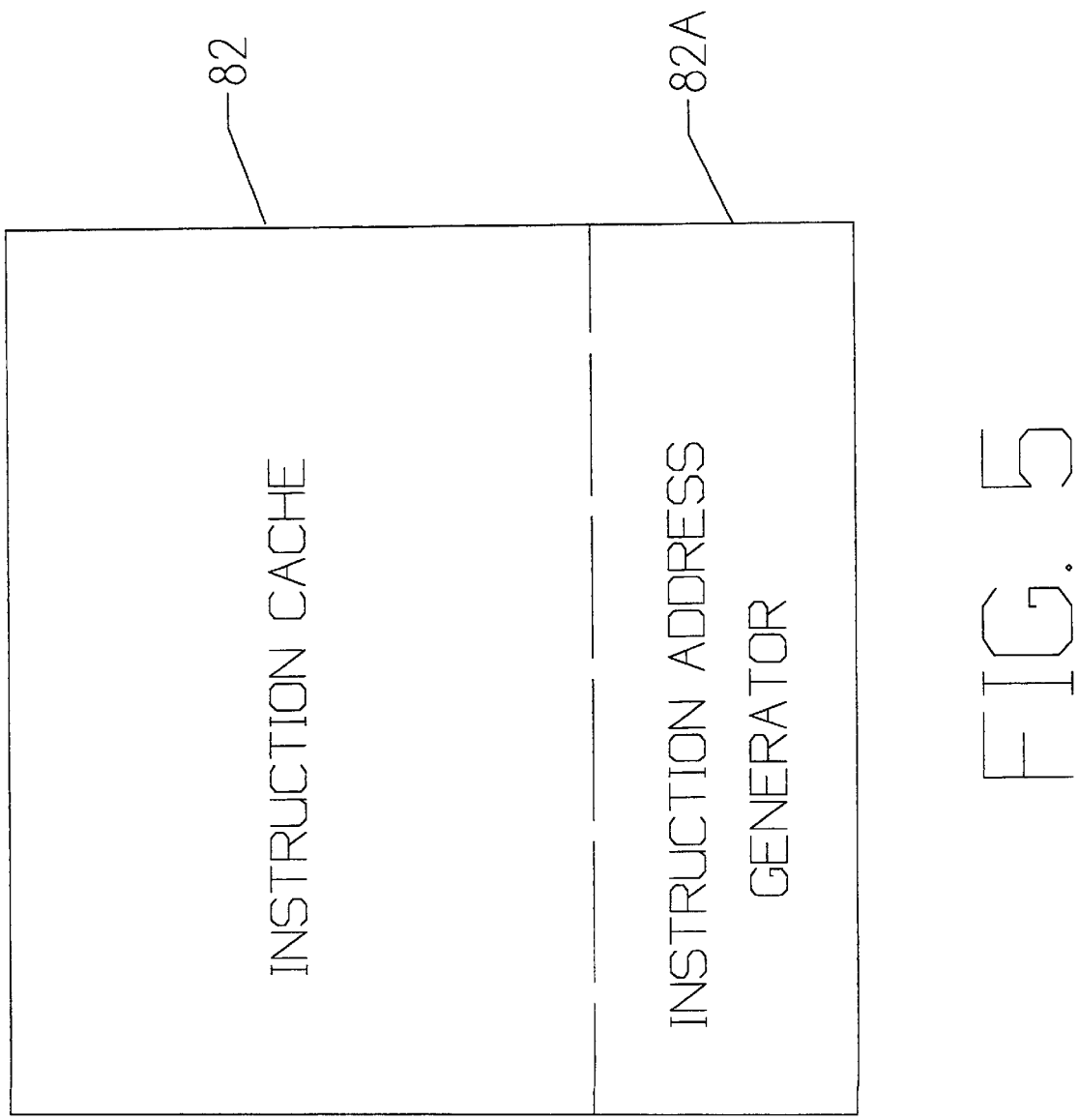
FIG. 5 is a block diagram illustrating the instruction address generator within the instruction cache block.
Figure 6:
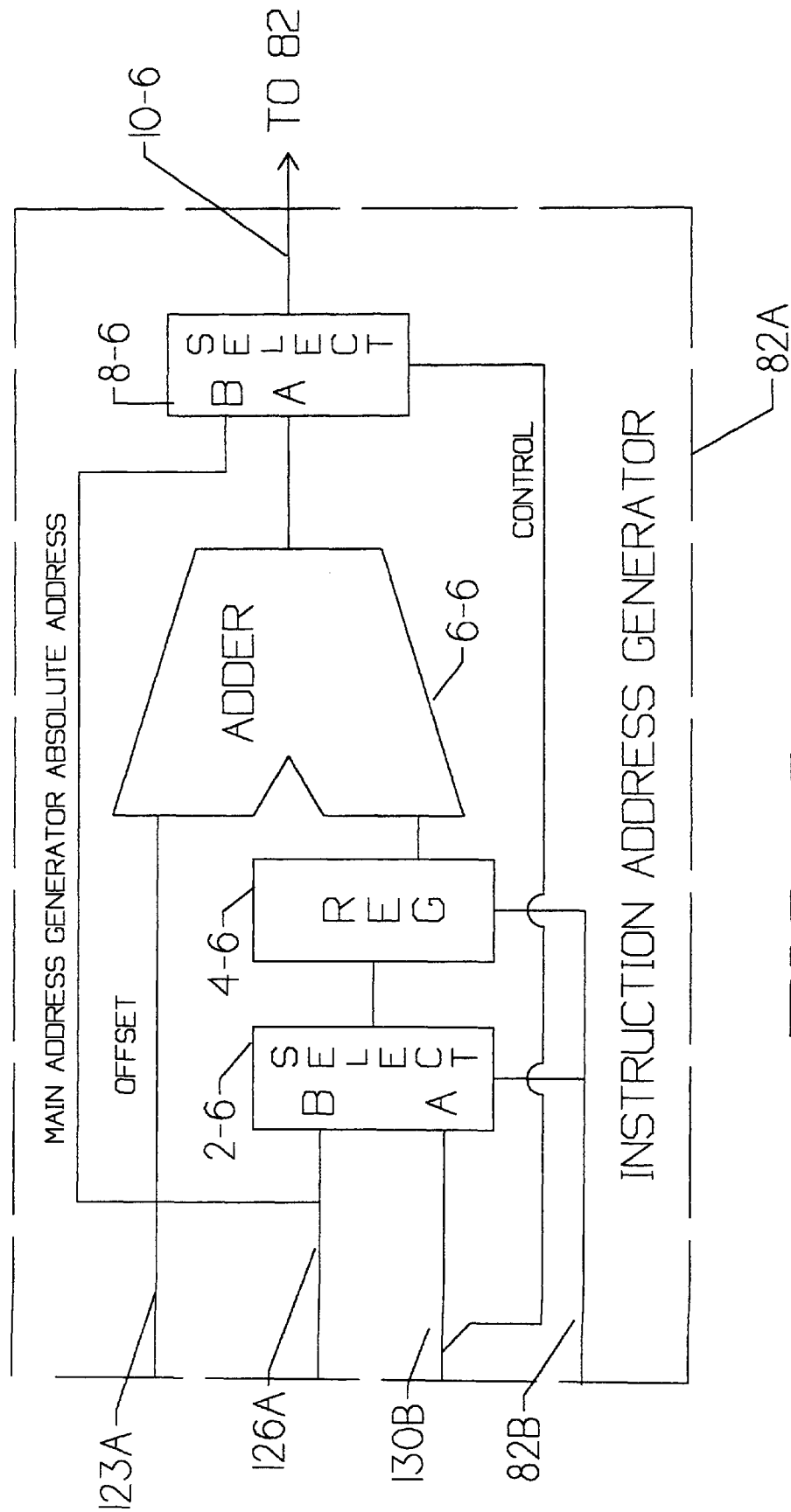
FIG. 6 is a block diagram of the added instruction cache generator.

As shown in FIGS. 5 and 6 instruction address generator 82A is a part of instruction cache 82 with the generator having select 2-6 and 8-6, a register 4-6, and an adder 6-6. Both select 2-6 and 8-6 provide the A input as the output when its control signal is high and the B input as the output when its control signal is low. The B input to both select 2-6 and select 8-6 is line 126A. Line 126A is from main address generator 126 and provides the base value to select 2-6, and an absolute address to select 8-6. Line 123A is from instruction decode 123 and provides the offset value as one of the inputs to adder 6-6. Here select 2-6 and register 4-6 are new and have been added to provide the functions necessary for speed up.

Line 82B, as described earlier, is high when only test speed up 130A has determined that the bank descriptor type field is correct for a transfer and when the M2-6 control signal, which is available as part of the previous system, is high at 5e, and is applied as the control signal to select 2-6 as a latch enable to latch the value from select 2-6 into register 4-6.

Line 130B is from test speed up 130 and provides the base field value and a transfer synchronization control signal one cycle later in time than the signal on line 82B. The base field value of line 130B is applied to the A input of select 2-6 and the select control signal to select 8-6.

When line 82B is high, this causes select 2-6 to select the A input and enables register 4-6 to store the input value on A into the register. The A input, selected by select 2-6 when line 82B is high, is line 130B which contains the base address value.

Adder 6-6 receives the offset value from line 123A, and the base address from register 4-6, sums them and provides the sum, which is the absolute value of the memory reference for the next instruction, to the A input of select 8-6. When the control signal on line 130B is high, select 8-6 will provide the output of adder 6-6 to line 10-6 and to instruction cache 82 which will apply this absolute address to fetch the next instruction. The new instruction is sent over lines 123A to instruction decode 123 for conventional processing. This process is completed by the end of 7e as shown by timing 2-3 in FIG. 3.

When line 82B and 130B are low this is normal operation, i.e., the initial bank descriptor type field was not 0, 4 or the instruction was not a Call, Goto or RTN. In normal operation with 82B and 130B low, select 8-6 will select the B input which is line 126A, the absolute address from the main address generator 126, and provide it to instruction cache 82, and the base value on line 126A is entered into register 4-6 to keep the instruction address generator 82A in synchronism with the main address generator 126. The new instruction is sent over lines 123A to instruction decode 123 for conventional processing. This process is completed by the end of 8e for timing 12-3 in FIG. 3. The reason that the speed up transfer requires one less cycle than the previous system is that when adder 6-6 is used to generate the memory address, rather than the main address generator 126, fewer checks are made in series with fetching the target instruction. The main address generator 126 does a full address check on the absolute address in parallel with the instruction fetch being performed by instruction cache 82. If these checks fail the normal abort sequence is invoked. This speed up transfer substitution results in saving one major cycle every time a selected transfer instruction with initial bank desceriptor of type 0 or 4 appears.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. An apparatus for absolute instruction address generation of a class of normal extended mode transfer instructions in a multiprogrammed instruction processor including a plurality of memory banks, and including absolute address main address generation apparatus comprising:
   a) testing means for determining whether a current instruction is one of a set of predetermined transfer instructions;
   b) means for generating a first control signal which has a first state whenever one of the predetermined transfer instructions is present, otherwise generating a first control signal with a second state;
   c) adder means for generating an absolute first address by adding the base address stored in the base register of the current instruction to an offset also provided by the current instruction;
   d) means for generating a second control signal, which changes state, one memory cycle after the first control signal changes state, to the same state as the first control signal;
   e) first selection means for selecting a first value when the first control signal is in the first state, and selecting a second value when the first control signal is in the second state;
   f) latching means for latching the first selection means selection into the base register whenever the first control signal changes state;
   g) second selection means for selecting the absolute value from the adder means when the second control signal is in the first state and for selecting the absolute value from the main address generator when the second control signal is in the second state.

2. Apparatus as in claim 1 wherein said testing means comprises an AND gate having three inverted inputs representing a hexadecimal number, which generates the first control signal first state only when the inputs represent predetermined hexadecimal numbers.

3. Apparatus as in claim 2 wherein said first selection means comprises a relay controlled by the first control signal.

4. Apparatus as in claim 3 wherein said second selection means comprises a relay controlled by the second control signal.

5. A method for absolute instruction address generation of a class of normal extended mode transfer instructions in a multiprogrammed instruction processor including a plurality of memory banks, and including absolute address main address generation apparatus comprising the steps of:
   a) testing to determine whether a current instruction is one of a set of predetermined transfer instructions;
   b) generating a first control signal which has a first state whenever one of the predetermined transfer instructions is present, which otherwise has a second state;
   c) generating an absolute first address by adding a base address stored in the base register of the current instruction to an offset also provided by the current instruction;
   d) generating a second control signal, which changes state to the same state as the first control signal state, one memory cycle after the first control signal changes state;
   e) selecting a first base register value when the first control signal is in the first state, and selecting a second base register value when the first control signal is in the second state;
   f) latching the first selection means selection into the base register whenever the first control signal changes state;

g) selecting the added absolute value obtained by adding the base address stored in a base register to an offset provided by the current instruction when the second control signal is in the first state, and selecting the absolute value from the main address generator when the second control signal is in the second state.

* * * * *